US011790892B1

(12) United States Patent
Kessler

(10) Patent No.: US 11,790,892 B1
(45) Date of Patent: Oct. 17, 2023

(54) VOICE-DRIVEN APPLICATION PROTOTYPING USING MACHINE-LEARNING TECHNIQUES

(71) Applicant: CDW LLC, Vernon Hills, IL (US)

(72) Inventor: Joseph Kessler, Grayslake, IL (US)

(73) Assignee: CDW LLC, Vernon Hills, IL (US)

( * ) Notice: Subject to any disclaimer, the term of this patent is extended or adjusted under 35 U.S.C. 154(b) by 254 days.

(21) Appl. No.: 16/885,183

(22) Filed: May 27, 2020

(51) Int. Cl.
   *G10L 15/16* (2006.01)
   *G10L 15/02* (2006.01)
   *G06N 20/00* (2019.01)
   *G06N 5/02* (2023.01)

(52) U.S. Cl.
   CPC .............. *G10L 15/16* (2013.01); *G06N 5/02* (2013.01); *G06N 20/00* (2019.01); *G10L 15/02* (2013.01)

(58) Field of Classification Search
   None
   See application file for complete search history.

(56) References Cited

U.S. PATENT DOCUMENTS

| | | | | |
|---|---|---|---|---|
| 9,348,815 | B1* | 5/2016 | Estes | G06F 40/30 |
| 11,238,115 | B1* | 2/2022 | Newman | G06Q 30/0627 |
| 2012/0144286 | A1* | 6/2012 | Bank | G06F 3/0308 |
| | | | | 715/230 |
| 2017/0024375 | A1* | 1/2017 | Hakkani-Tur | G06F 16/337 |
| 2018/0107588 | A1* | 4/2018 | Singi | G06F 11/3664 |
| 2018/0167490 | A1* | 6/2018 | Morton | G06F 3/167 |
| 2019/0121801 | A1* | 4/2019 | Jethwa | G06F 16/243 |
| 2019/0340111 | A1* | 11/2019 | Kim | G06F 11/3696 |

OTHER PUBLICATIONS

K. Moran, et.al., "Machine Learning-Based Prototyping of Graphical User Interfaces for Mobile Apps," in IEEE Transactions on Software Engineering, vol. 46, No. 2, pp. 196-221, Feb. 1, 2020 (Year: 2020).*
Wilson, James, and Daniel Rosenberg. "Rapid prototyping for user interface design." Handbook of human-computer interaction. North-Holland, 1988. 859-875 (Year: 1988).*

(Continued)

*Primary Examiner* — Bhavesh M Mehta
*Assistant Examiner* — Nandini Subramani
(74) *Attorney, Agent, or Firm* — MARSHALL, GERSTEIN & BORUN LLP; Randall G. Rueth

(57) ABSTRACT

A method includes capturing an event, analyzing the event to generate graphs, receiving a natural language utterance, identifying an entity and a command, modifying the graphs; and emitting an application prototype. An application prototyping server includes a processor; and a memory storing instructions that, when executed by the processor, cause the server to capture an event, analyze the captured event to generate graphs, receive a natural language utterance, identify an entity and a command, modify the graphs; and emit an application prototype. A non-transitory computer readable medium containing program instructions that when executed, cause a computer to: capture an event, analyze the captured event to generate graphs, receive a natural language utterance, identify an entity and a command, modify the graphs; and emit an application prototype.

17 Claims, 12 Drawing Sheets

(56) References Cited

OTHER PUBLICATIONS

Yang et al., Automated Prototype Generation From Formal Requirements Model, IEEE Transactions on Reliability, Sep. 2, 2019.

Proto.io—Prototypes that feel real, downloaded from the Internet at: <https://proto.io>, Apr. 20, 2020.

Yang et al., RM2PT: A tool for automated prototype generation from requirements model, ICSE 2019 Conference, May 25-31, 2019, Montreal, Canada (2019).

Discovery Machine, Inc., Automated Generation of Usability Prototypes and Tactical Software, US Department of Defense, Navy, Contract No. N00421-03-P-0735 (2003).

Phuangphoo et al., Automated Testing Featuring Prototype Generation from Harvested Requirements Specification. In: Kim et al. (eds), Computer Applications for Software Engineering, Disaster Recovery, and Business Continuity. Communications in Computer and Information Science, vol. 340. Springer, Berlin, Heidelberg, pp. 88-95 (2012).

* cited by examiner

US 11,790,892 B1

VOICE-DRIVEN APPLICATION PROTOTYPING USING MACHINE-LEARNING TECHNIQUES

TECHNICAL FIELD

The present disclosure is generally directed to methods and systems for voice-driven application prototyping using machine learning techniques, and more particularly, for generating an application prototype based on a profiled application.

BACKGROUND

Creating computing applications, from simple computing applications (e.g., web sites) for personal use, to small business computing applications, to large-scale enterprise application development, is very time consuming and expensive. An enterprise corporation (e.g., a multi-brand technology solutions provider servicing business, government, education and/or healthcare customers) may allocate large yearly budgets for developing enterprise and utility applications, for and external use.

Much of the work required for developing enterprise applications is boilerplate that is straightforward for humans to understand. However, humans are required to develop the boilerplate because machines do not understand the intention of the applications, and are unable to produce parts of the applications.

Further, application development is tedious. Often a software development team has a clear idea of how the application should work, as well as where to start, but the implementation is repetitive and requires manual effort. The process of software development may include a prototyping stage in which dummy user interfaces are considered and refined prior to the main development effort. However, conventionally, such dummy user interfaces must be created manually.

BRIEF SUMMARY

In one aspect, a computer-implemented method for generating an application prototype based on a profiled application includes capturing one or more events corresponding to the profiled application, analyzing the captured events to generate a domain knowledge graph and a user interface knowledge graph, receiving a natural language utterance from a user, identifying at least one entity and at least one command in the natural language utterance, modifying the domain knowledge graph and the user interface knowledge graph by analyzing the at least one entity and the at least one command; and emitting the application prototype by analyzing the modified domain knowledge graph and modified user interface knowledge graph.

In another aspect, an application prototyping server includes one or more processors; and a memory storing instructions that, when executed by the one or more processors, cause the server to capture one or more events corresponding to the profiled application, analyze the captured events to generate a domain knowledge graph and a user interface knowledge graph, receive a natural language utterance from a user, identify at least one entity and at least one command in the natural language utterance, modify the domain knowledge graph and the user interface knowledge graph by analyzing the at least one entity and the at least one command; and emit the application prototype by analyzing the modified domain knowledge graph and modified user interface knowledge graph.

In yet another aspect, a non-transitory computer readable medium containing program instructions that when executed, cause a computer to capture one or more events corresponding to the profiled application, analyze the captured events to generate a domain knowledge graph and a user interface knowledge graph, receive a natural language utterance from a user, identify at least one entity and at least one command in the natural language utterance, modify the domain knowledge graph and the user interface knowledge graph by analyzing the at least one entity and the at least one command; and emit the application prototype by analyzing the modified domain knowledge graph and modified user interface knowledge graph.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
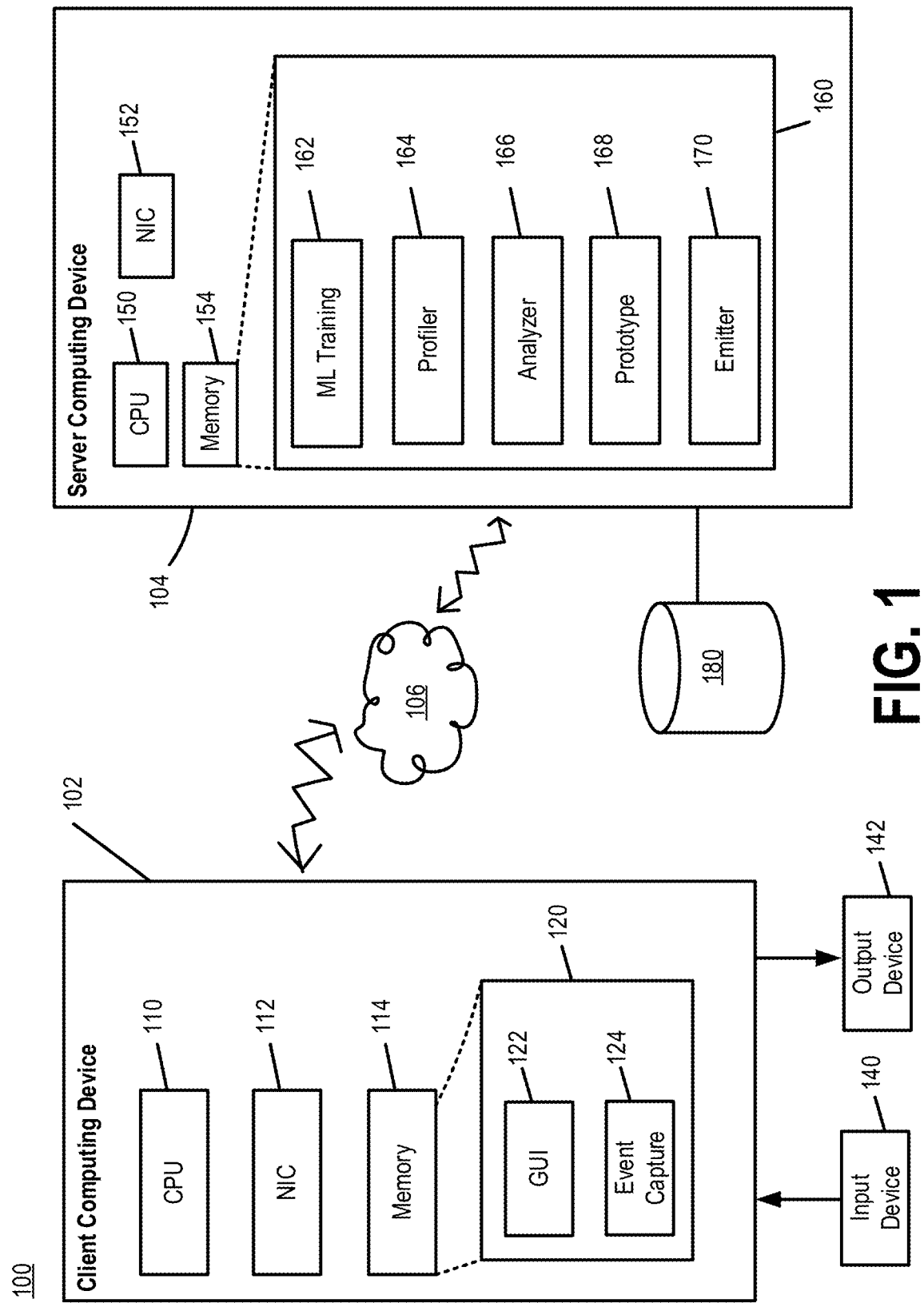
FIG. 1 depicts an exemplary computing environment in which methods and systems for voice-driven application prototyping using machine-learning techniques may be implemented, according to one embodiment.

The figures depict preferred embodiments for purposes of illustration only. One of ordinary skilled in the art will readily recognize from the following discussion that alternative embodiments of the systems and methods illustrated herein may be employed without departing from the principles of the invention described herein.

DETAILED DESCRIPTION

Overview

The present techniques provide methods and systems for, inter alia, enabling software developers to save time, and ultimately money, by accelerating the process of developing software. The present techniques may include voice-enabled, intent-driven programming (e.g., using natural language processing techniques) that allow the user (e.g., a software designer/developer, quality assurance engineer, etc.) to specify one or more prototype constraints. By using the present techniques, the user may speak an application into existence.

The present techniques may include document harvesting, and style transfer instructions for mimicking existing applications, including larger-scale systems. The present techniques may be used by enterprise-level teams to accelerate the time to market of applications. The present techniques may be used by non-technical audiences to help produce samples for a software development team.

The present techniques may include methods and systems for decomposing (e.g., by decompiling) existing software applications to generate one or more training data sets. The training data set may be used as stylistic and/or domain exemplars for training one or more machine learning (ML) models. The one or more trained ML models may be configured to customize and emit new application prototypes based upon the training data sets.

The present techniques may include receiving and processing voice commands and/or text input allowing a user (e.g., a designer) to input specifications. The present techniques may further include using intent recognition technology to convert requirement utterances into internal markup representing business domain knowledge and/or user interface designs. The present techniques may generate new and/or modify existing application code/markup accordingly, allowing for the formation of complex prototypes. The present techniques may further include extraction of style information from existing user interfaces. For a shopping cart design, for example, one or more machine learning models may be trained according to how other cart applications are presented. For a new module in an existing enterprise system, the machine learning models may be trained using existing screens in order to produce a new prototype in the style of existing parts of the system.

Specifically, convolutional neural networks (CNNs) may be used to infer user interface structure, placement, positioning, etc. when markup parsing is not possible or useful. The present techniques may employ real-time application observation. For example, the present techniques may include observing the user operating one or more source applications. The observation may include collecting identifiers and applying application decompiling techniques in real time. For example, the present techniques may include identification of relationships between fields on the screen by observing the user while operating against sample training data.

In some embodiments, the sample training data set may include observation data corresponding to an enterprise system for which source code is available. In such cases, the present techniques may include augmenting the sample data set by analyzing relationships between screen fields and databases using a technology such as DynaTrace PurePaths or equivalent.

The present techniques may perform identification of common field grouping and layout. For example, a system might examine existing screens of an enterprise application and determine that certain status information always appears on the left gutter. This may involve techniques such as multi-layer perceptrons, markup analysis, and/or other machine learning techniques.

The present techniques may include performing style and constraint transfer between input samples and output user interfaces. Internal markup (e.g., an intermediate representation/bytecode) may be used for this step. Existing markup style may be passed through a discriminator network with a generative adversarial network producing content based upon new requirements and layouts. The network may output a screen layout, and code/markup may be generated for new user interfaces based upon markup from the generative adversarial network.

The present techniques allow the user to develop application prototypes. Currently, enterprise application modules may be developed on an ongoing basis. Often, new modules are needed, in the style of an existing module/application of the enterprise or another entity. Many design patterns, vocabularies and terminology associated with one or more domains may be used in enterprise applications. For example, the enterprise company may refer to an Electronic Data Code (EDC), vendor names, product names, etc.

The present techniques allow the developer to create one or more module prototypes with access to such vocabularies. The module prototypes may provide a foundation for a further application development. In some embodiments, the module prototypes may be production-ready. In some embodiments, the module prototypes may require further development (e.g., to add robustness and/or security features).

In some embodiments, the user may speak commands that are received and analyzed using natural language processing (NLP) to allow a developer to cause the prototype to be created and/or modified. In some embodiments, the present techniques may be used for migration/cross-compilation of applications. For example, the user may analyze an application for a first computing platform (e.g., Apple iOS) to create a corresponding application for a second computing platform (e.g., Google Android).

Exemplary Computing Environment

FIG. 1 depicts an exemplary computing environment 100 in which the techniques disclosed herein may be implemented, according to an embodiment. The environment 100 includes a client computing device 102, a server 104, and a network 106. Some embodiments may include a plurality of client computing devices 102 and/or a plurality of servers 104.

The client computing device 102 may be an individual server, a group (e.g., cluster) of multiple servers, or another suitable type of computing device or system (e.g., a collection of computing resources). For example, the client computing device 102 may be any suitable computing device (e.g., a server, a mobile computing device, a smart phone, a tablet, a laptop, a wearable device, etc.). In some embodiments, one or more components of the computing device 102 may be embodied by one or more virtual instances (e.g., a cloud-based virtualization service). In such cases, one or more client computing devices 102 may be included in a remote data center (e.g., a cloud computing environment, a public cloud, a private cloud, etc.).

The network 106 may be a single communication network, or may include multiple communication networks of one or more types (e.g., one or more wired and/or wireless local area networks (LANs), and/or one or more wired and/or wireless wide area networks (WANs) such as the Internet). The network 106 may enable bidirectional communication between the client computing device 102 and the server 104, and/or between multiple client computing devices 102, for example.

The client computing device 102 includes a processor 110 and a network interface controller (NIC) 112. The processor 110 may include any suitable number of processors and/or processor types, such as CPUs and one or more graphics processing units (GPUs). Generally, the processor 110 is configured to execute software instructions stored in a memory 114. The memory 114 may include one or more persistent memories (e.g., a hard drive/solid state memory) and stores one or more sets of computer executable instructions/modules 120, including a graphical user interface (GUI) module 122, and an event capture module 124.

The client computing device 102 further includes an input device 140 and an output device 142. The input device 140 may include any suitable device or devices for receiving input, such as one or more microphones, one or more cameras, a hardware keyboard, a hardware mouse, a capacitive touch screen, etc. The output device 142 may include any suitable device for conveying output, such as a hardware speaker, a computer monitor, a touch screen, etc. In some cases, the input device 140 and the output device 142 may be integrated into a single device, such as a touch screen device that accepts user input and displays output. The client computing device 102 may be associated with (e.g., owned/operated by) a company that services enterprise customers.

The NIC 112 may include any suitable network interface controller(s), such as wired/wireless controllers (e.g., Ethernet controllers), and facilitate bidirectional/multiplexed networking over the network 106 between the client computing device 102 and other components of the environment 100 (e.g., another client computing device 102, the server 104, an electronic database, etc.).

The one or more modules 120 implement specific functionality. For example, in an embodiment, the GUI module 122 includes computer-executable instructions that, when executed, cause a computer to display information (e.g., a web page, a computing application, data, etc.) on a computing screen (e.g., via the output device 142). In an embodiment, the GUI module 122 receives input from the input device 140. For example, the GUI module 122 may receive user input via a touchscreen, computer mouse, etc. The GUI module 122 may receive typed information (i.e., text) via a touch screen or keyboard input device 140. The GUI module 122 may include instructions for storing input (e.g., in the memory 120). The GUI module 122 may include instructions for transmitting the input via the network 106.

The event capture module 124 may capture information from the user. For example, the event capture module 124 may analyze input received by the GUI module 122 to detect input events (e.g., one or more mouse clicks). The event capture module 124 may include a set of computer-executable instructions for capturing screen captures (i.e., one or more screenshots) corresponding to the output device 142. Specifically, as the user uses the client computing device 102, the event capture module 124 may capture the one or more screenshots at a predetermined interval (e.g., once per second) and/or in response to one or more events. For example, the event capture module 124 may capture the screenshots in response to the user clicking a link, moving a cursor, navigating from one page to another and/or any other suitable detectable event. The event capture module 124 may store the screenshots in the memory 114 and/or transmit the screenshots via the network 106 to the server 104.

The server 104 includes a processor 150 and a network interface controller (NIC) 152. The server 104 may further include a database 180. The database 180 may be a structured query language (SQL) database (e.g., a MySQL database, an Oracle database, etc.) or another type of database (e.g., a not only SQL (NoSQL) database). The server 104 may include a library of client bindings for accessing the database 180. In some embodiments, the database 180 is located remote from the server 104. For example, the database 180 may be implemented in a computing cloud, in some embodiments.

The processor 110 may include any suitable number of processors and/or processor types, such as CPUs and one or more graphics processing units (GPUs). Generally, the processor 150 is configured to execute software instructions stored in a memory 154. The memory 154 may include one or more persistent memories (e.g., a hard drive/solid state memory) and stores one or more set of computer executable instructions/modules 160, including a machine learning training module 162, a profiler module 164, an analyzer module 166, a prototype 168; and an emitter module 170. Each of the modules 160 implements specific functionality related to the present techniques. The modules 160 may execute concurrently (e.g., on the CPUs 150) as respective computing processes, in some embodiments.

The ML training module 162 may train one or more machine learning models. For example, the ML training module 162 may train a model to output domain information and/or graphical user interface information by analyzing example applications as training data. For example, the ML training module may be provided with screenshots of a shopping cart paradigm (e.g., an Amazon Cart, a CDW shopping cart, etc.). The ML training module 162 may be trained to extract characteristics of the individual cards, and/or abstract features that are common to both cart implementations (e.g., Item, Quantity, Price, etc.). In some embodiments, the present techniques may include training a generative adversarial network (GAN) to perform style transfer from the profiled application to a target application, or prototype.

The ML training module 162 is generally configured to load, create, train, and/or store ML models for use by the server 104 and/or the client 102. For example, the ML training module 168 may include instructions for training a generative adversarial network ML model or an MLP. For example, the ML training module 162 may receive/retrieve data captured by the profiler module 164. In general, the ML training module 162 may train models by, inter alia, establishing a network architecture, or topology, and adding layers that may be associated with one or more activation functions (e.g., a rectified linear unit, softmax, etc.), loss functions and/or optimization functions. Multiple different types of artificial neural networks may be employed, including without limitation, recurrent neural networks, convolutional neural networks, and deep learning neural networks. Data sets used to train the artificial neural network(s) may be divided into training, validation, and testing subsets; these subsets may be encoded in an N-dimensional tensor, array, matrix, or other suitable data structures. Training may be performed by iteratively training the network using labeled training samples. Training of the artificial neural network may produce byproduct weights, or parameters which may be initialized to random values. The weights may be modified as the network is iteratively trained, by using one of several gradient descent algorithms, to reduce loss and to cause the values output by the network to converge to expected, or "learned", values.

In an embodiment, a regression neural network may be selected which lacks an activation function, wherein input data may be normalized by mean centering, to determine loss and quantify the accuracy of outputs. Such normalization may use a mean squared error loss function and mean absolute error. The artificial neural network model may be validated and cross-validated using standard techniques such as hold-out, K-fold, etc. In some embodiments, multiple artificial neural networks may be separately trained and operated, and/or separately trained and operated in conjunction.

In an embodiment, the trained ML model (e.g., an MLP) may include an artificial neural network (ANN) having an input layer, one or more hidden layers, and an output layer. Each of the layers in the ANN may include an arbitrary number of neurons. The plurality of layers may chain neurons together linearly and may pass output from one neuron to the next, or may be networked together such that the neurons communicate input and output in a non-linear way. In general, it should be understood that many configurations and/or connections of ANNs are possible.

The input layer may correspond to a large number of input parameters (e.g., one million inputs), in some embodiments, and may be analyzed serially or in parallel. Further, various neurons and/or neuron connections within the ANN may be initialized with any number of weights and/or other training parameters. Each of the neurons in the hidden layers may analyze one or more of the input parameters from the input layer, and/or one or more outputs from a previous one or more of the hidden layers, to generate a decision or other output. The output layer may include one or more outputs, each indicating a prediction or an expected value. In some embodiments and/or scenarios, the output layer includes only a single output. For example, a neuron may correspond to one of the neurons in the hidden layers. Each of the inputs to the neuron may be weighted according to a set of weights W1 through Wi, determined during the training process (for example, if the neural network is a recurrent neural network) and then applied to a node that performs an operation a. The operation a may include computing a sum, a difference, a multiple, or a different operation. In some embodiments weights are not determined for some inputs. In some embodiments, neurons of weight below a threshold value may be discarded/ignored. The sum of the weighted inputs, r1, may be input to a function which may represent any suitable functional operation on r1. The output of the function may be provided to a number of neurons of a subsequent layer or as an output of the ANN.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

In some embodiments, the ML training module 162 may train a one or more CNNs. For example, the ML training module may train a CNN by causing the CNN to analyze existing cart applications to identify application features (e.g., fonts, domain constraints, etc.). Then, the trained CNN may be used to identify such features in profiled applications that were not used to train the CNN. The one or more features may be added as nodes of the domain knowledge graph and/or the user interface knowledge graph.

The profiler module 164 may collect information on one or more existing profiled applications. For example, the profiler module 164 may analyze an application executing in the client computing device 102, the server 104 and/or another computing device. The profiler module 164 may receive events from the event capture module 124. The profiler module 164 may store the received screen captures and/or events to a database (e.g., the database 180). The profiler module 164 may collect requirements via utterances (e.g., voice-to-text).

The profiler module 164 may include a source application selector sub-module that analyzes the profiled application using the one or more trained ML models. In some embodiments, the profiler module 164 may crawl one or more URLs of an application. The profiler module 164 may collect style information, layouts, grouping information, and element position information for later analysis.

In some embodiments, the profiler module 164 may collect the information by observation. For example, some profiled applications may include server-side logic that cannot be crawled. In such cases, the profiler module 164 may capture screenshots and/or event logs of a user interacting with the profiled application. For example, the profiler module 164 may collect screenshots corresponding to the user adding items to a cart, removing items from the cart, changing quantities of items in the cart, etc. The profiler module 164 may associate the screenshots with a user session and store the session and screenshots in a remote storage device (e.g., the server 104).

Another module (e.g., the analyzer module 166) may analyze state changes represented by the image and perform object detection to identify items in the image (e.g., a dropdown box). For example, a domain may be assigned to an element by analyzing a label in the image.

Figure 2:
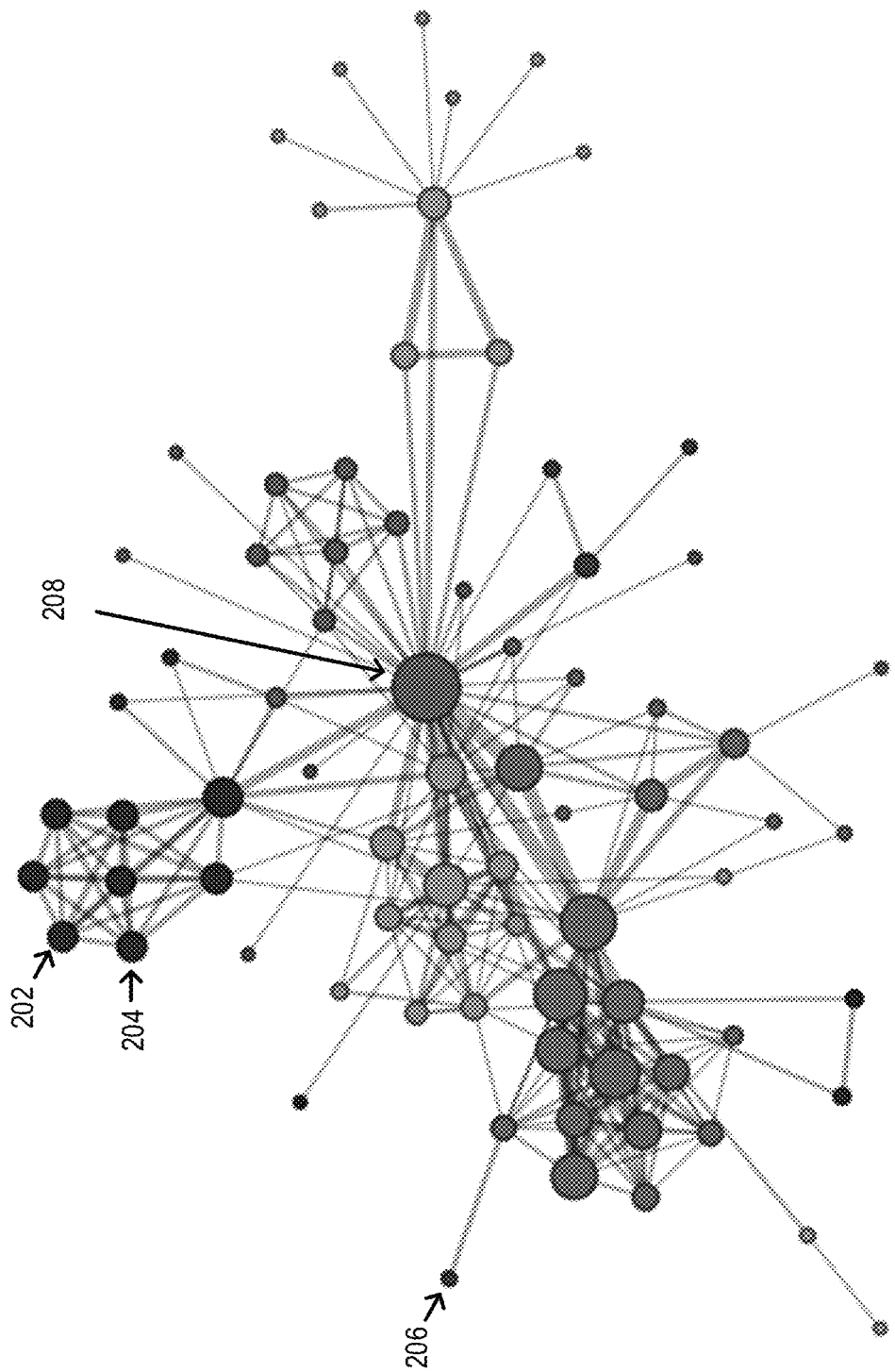
FIG. 2 depicts an exemplary knowledge graph, according to one embodiment.
Figure 3A:
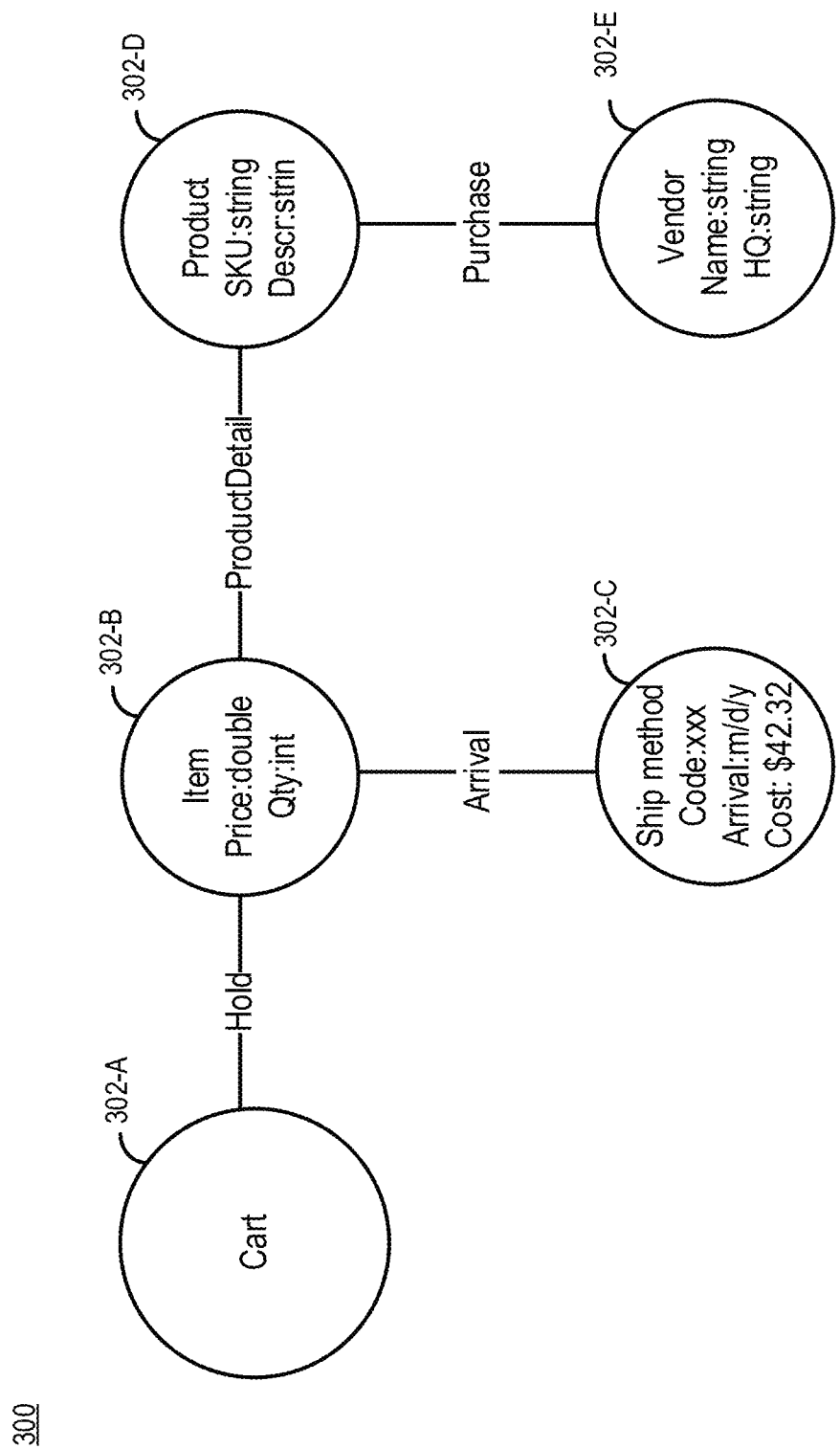
FIG. 3A depicts an exemplary domain graph schema, according to one embodiment.
Figure 3B:
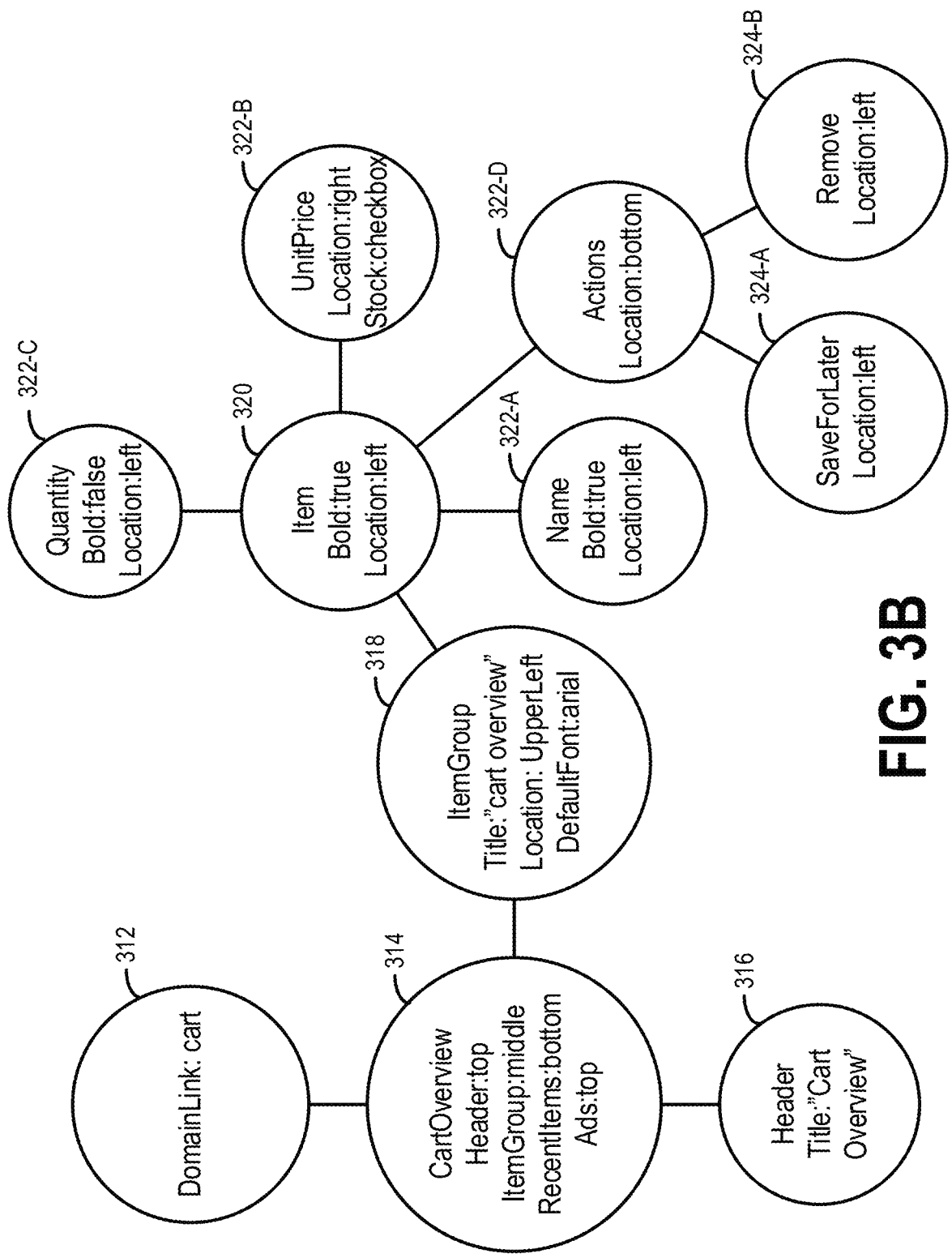
FIG. 3B depicts an exemplary user interface graph schema, according to one embodiment.

In general, the analyzer module 166 may generate one or more intermediate representations for each respective analyzed application. For example, a first intermediate representation may correspond to a business domain of the analyzed application. A second intermediate representation may correspond to the user interface of the business domain. The first intermediate representation and the second representation may be represented using a graphs, as depicted in FIG. 2. In some embodiments, the graph representation may include metadata, as shown in FIGS. 3A and 3B.

The analyzer module 166 may process data collected by the profiler module 164 to generate the intermediate representations of the profiled application (e.g., a bytecode representation). The intermediate representations may be platform-agnostic versions of the original application. The analyzer module 166 may include instructions for analyzing the information collected by the profiler module 164 to generate the intermediate representation of the profiled application (i.e., an application schema) including domain information. Specifically, the analyzer module 166 may include an event analyzer sub-module for linking actions to transitions, and/or a domain inference sub-module for extracting information corresponding to the domain of the application (e.g., business knowledge). The domain inference may be based on the collected information.

The analyzer module 166 may further include a user interface analyzer for performing screenshot analysis and/or for grouping style information and/or elements, for example, by analyzing cascading style sheet, JavaScript and/or HTML. The user interface analyzer may generate the second intermediate representation corresponding to the user interface, in some embodiments. The analyzer module 166 may further include a dynamic content analysis sub-module for analyzing dynamic content included in the profiled application. Dynamic content may include, for example, a search box.

The analyzer module 166 may include a compilation sub-module for converting the event, domain, user interface and dynamic content information into the intermediate representations (e.g., a knowledge graph, as depicted in FIG. 2). For example, the compilation sub-module may generate a domain graph schema, a user interface graph schema and/or a dynamic content schema, in some embodiments. The compilation sub-module may generate the one or more intermediate representations by traversal and/or by analyzing the information collected by the profiler using the one or more trained ML models.

The analyzer module may trace relationships between screens by analyzing the images captured by the profile module 164 using a trained machine learning model. The tracing may be based upon events, data displayed, and/or user interface layouts.

The analyzer module 166 may include a machine learning operation sub-module for operating one of the one or more trained ML models. In some embodiments, the ML operation sub-module may analyze the one or more screenshots captured by the profiler module 164 to identify objects and/or groups present in each screenshot, as discussed further below.

The prototype module 168 may include a source application decompiler sub-module. The source application decompiler may include instructions for identifying style/user interface information. For example, the prototype module 168 may analyze an intermediate representation to find style information (e.g., fonts, groupings, user interface elements, etc.). The decompiler may determine domain constraints (e.g., that an input field may be ten digits long, that a quantity field requires a positive integer, etc.). The decompiler may identify properties of information (e.g., that a product identifier includes a given number of digits, that a product identifier includes a one-to-many relationship to product names, etc.).

To determine domain constraints, the decompiler sub-module may analyze multiple screens, either as the user browses the profiled application or after the fact (e.g., by analyzing screenshots). The decompiler sub-module may identify common elements between successive pages (e.g., a product name). The decompiler module may analyze the position of elements to understand, for example, that the user performed an add cart action. The decompiler module may analyze one or more events using a CNN.

As discussed below, in some embodiments, the decompiler module may use a multi-layer perceptrons (MLP) to determine that two page elements correspond to the same entity or concept. The decompiler module may use a trained Long Short-Term Memory (LSTM) recurrent artificial neural network (ANN) to predict a next user action in the face of ambiguity, for example, in a case where an entire profiled application is not captured.

The prototype module 168 may modify and/or combine the one or more intermediate representations. The prototype module 168 may add to the intermediate representations. In some embodiments, the prototype module 168 may base modifications and/or additions on specifications provided by a user in natural language. In such embodiments, the prototype module 168 may include a natural language processing sub-module. The NLP sub-module may receive an utterance and identify one or more domain entities and/or one or more user interface entities. The NLP sub-module may be trained using the domain knowledge graph and/or the user interface knowledge graph, as discussed below.

For example, the user may differentiate the prototype application from the profiled application by, for example, relocating graphical elements (e.g., a login button). The user may specify that product information be shown when user clicks button. The user may define actions using NLP. For example, the user may speak a natural language command to modify an aspect of the business domain and/or an aspect of the user interface of the profiled application. In some embodiments, the prototype module 168 may modify the intermediate representation using written specifications that are predetermined and/or provided by the user.

The emitter module 170 may generate output corresponding to the modified intermediate representation of the profiled application. The user may specify a target architecture, and the emitter module 170 may generate a specialized prototype based on the specified target architecture. In general, the emitter module 170 include instructions for reading the intermediate representation and for rendering structural and layout instructions (e.g., HTML elements corresponding to domain knowledge, and CSS elements for styling). The emitter module 170 may include an interpreter for each target output.

Specifically, the emitter module 170 may emit a prototype application using a plurality of interpreter plugins. For example, the emitter module 170 may output an application encoded in a markup language (e.g., XML, HTML), a programming language (e.g., Node.JS), a mobile application framework, etc. The emitter module 170 may include a set of computer-executable instructions for generating computer programs. In some embodiments, the emitter module 170 may generate server-side code. The emitter module 170 may output .NET programs, Windows Presentation Foundation (WPF) screens, Windows Forms (WinForms), etc.

In operation, the user may operate the profiled application using the client computing device 102. As the user operates the profiled application, the profiler module 164 receives screen captures corresponding to the profiled application. For example, when the profiled application is a shopping cart application, the screen captures may correspond to digital images displayed on the output device 142 during the user's operation of the profiled application. The profiler module 164 may receive input events (e.g., a mouse click, a keyboard input, a touch screen touch event, etc.) from the input device 140 via the network 106. The profiled application may be a personal computer (PC) computing application, a mobile application, etc. The decompiler sub-module may capture relationships and clicks and may determine event types (e.g., a touchscreen click, a mouse click, etc.).

In some embodiments, the present techniques may include identifying a data domain by analyzing underlying database schema (e.g., a database table) to determine data relationships and/or to determine which fields within a database or table are editable and which are immutable. For multiple databases, identifying the data domain may include identifying and analyzing cross-database relationships. Other modules (e.g., the emitter module 170) may use the data domain information to determine the structure of screens as well as smaller details such as editable/static fields. The data domain identification process further enables other modules (e.g., the analyzer module 166) to infer elements of the business domain. However, identifying the data domain may be limited to cases wherein the computing environment includes access to a physical database schema (e.g., via the database 180).

In some embodiments, the present techniques include identifying a business domain. The analysis module 166 may use the business domain to generate a prototype application, by analyzing the content of existing screens with similar elements, the nature of validations on those fields, and relationships between master-detail screens/pages. Where possible, the analysis module 166 may infer constraints by applying available database constraints and/or by ingesting unstructured documents (e.g., using cloud-based services).

In further embodiments, the present techniques may use semi-automatic training. For example, the prototype module 168 may map an intent of an utterance to a domain field. While many intents in the prototype process may be predefined, such as "pin to left" or "modal", domain-related fields may not be. The ML training module 162 may train a model to identify intents. That trained model may be used to identify intents included in voice or text commands. Further, a model trained for a first application may be used with a second application.

In some embodiments, the ML training module 162 may train a model to identify common or frequently-appearing fields a sample set. The ML training module 162 may identify fields that frequently appear together in the selected user interface sample set. Identification of fields may be performed by a combination of names (e.g., fields like "user" or "item description") and characteristics. The field names and/or characteristics may be analyzed by an artificial neural network (e.g., an MLP). The MLP may output generated user interfaces. More than one sample set may be used in order to generate user interfaces of different styles/technologies. In some embodiments, ML training module may use screenshots as training data, such that the trained model analyzes user interfaces from a visual perspective and not as underlying markup.

Exemplary Intermediate Representation

FIG. 2 depicts an exemplary knowledge graph 200. The knowledge graph 200 includes a first node 202, a second node 204 and a third node 206, for example. It should be appreciated that the knowledge graph 200 may include any suitable number of nodes. The knowledge graph 200 is depicted as a graph. In some embodiments, the knowledge graph 200 may have a different structure (e.g., a linear structure). The nodes of the knowledge graph 200 may be fully or partially connected. The edges between the nodes may be horizontal (e.g., as in the edge connecting the node 202 to the node 204) or vertical (e.g., as are the edges connected to the node 208). Some of the nodes of the knowledge graph 200 may be leaf nodes, such as the node 206. There may be a parent-child relationship between one or more of the nodes of the knowledge graph 200. In some embodiments the knowledge graph 200 correspond to the intermediate representation discussed with respect to FIG. 1, and may be represented in the memory 114, for example, using bytecode (e.g., Java bytecode).

The knowledge graph 200 may correspond to an application (e.g., a shopping cart application). For example, the cart may include fields (e.g., a quantity, an item, a price, a checkout button, etc.) each of which corresponds to a node in the knowledge graph 200. The knowledge graph 200 may have a hierarchical/tree structure including linked nodes having attributes (e.g., page→cart→item→{qty, unit price, estimated arrival date}). The knowledge graph 200 may include links between nodes. Multiple knowledge graphs 200 may be generated and compared (e.g., using a trained ML model) to determine, for example, that two concepts (e.g., two respective carts at different websites/applications) correspond to the same (e.g., a cart).

Exemplary Graph Domain Schema & User Interface Graph Schema

FIG. 3A depicts an exemplary domain graph schema 300. The domain graph schema 300 may correspond to domain knowledge (e.g., business knowledge) represented in the profiled application, and extracted by the analyzer module 166 of FIG. 1. The domain graph schema 300 may be inferred by the analyzer 166 ingesting and analyzing the profiled application. The domain graph schema 300 may include one or more entities connected by respective relational edges. For example, the depicted domain graph schema 300 includes a cart entity node 302-A connected to an item entity node 302-B by a hold edge representing the relationship between the cart entity node 302-A and the item entity node 302-B. The item entity node 302-B is in turn connected to a ship method entity node 302-C by an arrival edge, and to a product entity node 302-D by a product detail edge. The product entity node 302-D is connected to a vendor entity node 302-E by a purchase edge. The nodes and edges of the domain graph schema 300 are discovered by the analyzer module 166 of the server computing device 104 of FIG. 1, in some embodiments.

In some embodiments, the domain graph schema 300 may include one-to-many and or many-to-many node relationships. The nodes of the graph schema 300 may include metadata specifying fields and/or data associated with each node. In some embodiments, the metadata may include respective data types. For example, the item entity node 302-B includes a price and quantity of types double and integer, respectively. In embodiments that include automatic schema discovery, the metadata fields and respective data types may be discovered by analyzing the database schema (e.g., the fields included in an Items table). In still further embodiments, the user may provide the metadata fields and respective types using a written specification document.

FIG. 3B depicts an exemplary user interface graph schema 310. The user interface graph schema 310 may include one or more domain nodes. For example, the graph schema 310 includes a domain node 312. The domain nodes 312 may refer (e.g., via a hyperlink or other suitable addressing scheme) to a node of the domain graph schema 300 (e.g., the cart entity node 302-A). Of course, in some embodiments, the domain node 312 may refer to a different node (or nodes) of the domain graph schema 300.

In some embodiments, the user interface graph schema 310 may include one-to-many and or many-to-many node relationships. For example, the user interface graph schema 310 may include further nodes representing additional user interface elements. For example, the domain node 312 is connected to a cart overview node 314. The cart node 314 is connected to a header node 316 and an item group node 318. The item group node 318 is connected to an item node 320 that represents one item within the item group. The nodes may be nested in a one-to-many or many-to-many structure.

For example, the item node be connected to an item name node 322-A, a unit price node 322-B, a quantity node 322-C and an actions node 322-D. The actions node 322-D may be connected to further children nodes such as a save for later node 324-A and a remove node 324-B. The FIG. 3B depicts a simplified example for discussion purposes. It will be appreciated by those of ordinary skill in the art that any number of nodes belonging to more complex applications having recursive structure may be represented using the techniques discussed above.

Exemplary Profiled Application

Figure 3C:
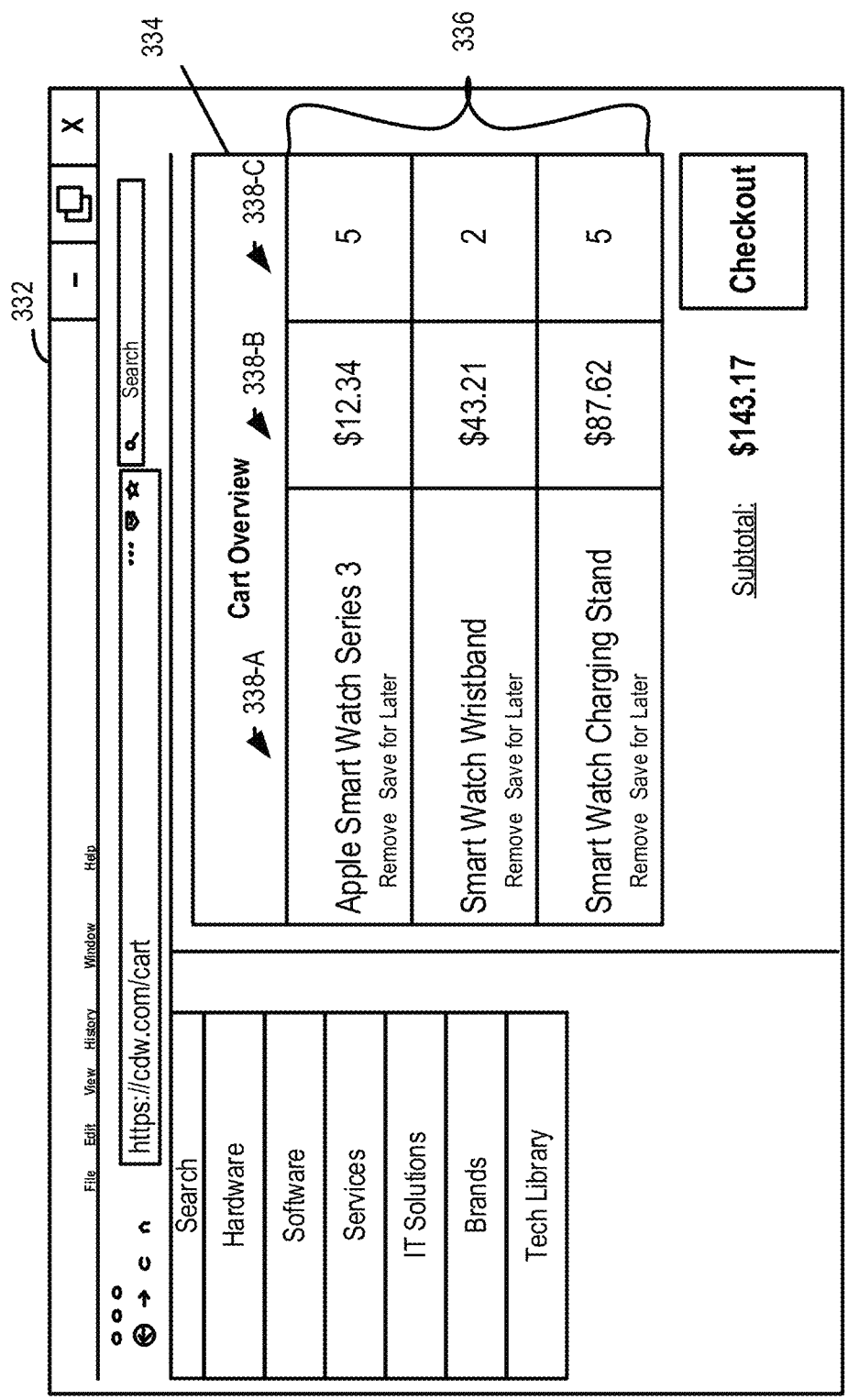
FIG. 3C depicts an exemplary profiled application, according to one embodiment.

FIG. 3C depicts an exemplary profiled application 330. The profiled application includes a graphical user interface 332, including a cart module 334. The cart module 332 may correspond to the cart entity node 302-A of FIG. 3A. The cart entity node 302-A may determine what the cart module 332 is (e.g., that the cart holds an item, based on the edge between the cart entity 302-A and the item entity 302-B). The cart module 332 may also correspond to the cart overview node 314 of FIG. 3B, which may determine how the cart module 332 appears. In general the domain nodes of FIG. 3A determine the composition of entities (e.g., a cart, an item, etc.) and the user interface nodes of FIG. 3B determine the appearance of the entities. A dynamic behavior graph may further determine the behavior of the entities.

Continuing the cart example, the styling of the cart entity node 302-A depicted in FIG. 3C may correspond to the cart overview node 314 of FIG. 3B, which specifies the header position, item grouping, sorting, advertisement placement, etc. The properties specified are merely examples, and others may be included in some embodiments. The cart module 332 includes a header, entitled "Cart Overview," the value of which may correspond to the title attribute of the header node 316. The cart module 332 includes one or more items 336, each which may correspond to individual instances of the item node 320 of FIG. 3B.

Each of the items 336 in the cart module 332 may include an item name column 338-A, an item price column 338-B and a quantity column 338-C that correspond, respectively, to the item name node 322-A, the unit price node 322-B and the quantity node 322-C. Each of the items 336 may include elements for modifying a module (e.g., the cart module 332). For example, the FIG. 3C includes a "Remove" and "Save for Later" action, including styling corresponding to that of respective children nodes of the actions node 322-D of FIG. 3B. As above, the cart example is used for explanatory purposes. It will be appreciated by those of ordinary skill in the art that more complex and/or larger structures may be represented using the present techniques Exemplary Natural Language-Based Application Prototyping The user may modify the profiled application 330, in some embodiments. For example, the profiled application 330 may correspond to a copy of the existing application profiled by the user. The user may modify the profiled application 330 by using an input device via the input device 140. For example, the user may modify the document object model when the profiled application 330 is a web site. In other embodiments, the profiled application 330 may be displayed in an environment (e.g., an editing environment) that allows the user to use point and click design techniques to add, remove and/or modify the domain and/or user interface elements of the profiled application 330. In some embodiments, the user may modify the profiled application 330 by uttering natural language commands via the input device 140. The commands may include predetermined verbs (e.g., add, remove, move, etc.). The user's natural language commands may include entities that are identified by the profiler module 164, for example. The user may refer to domain information and cause information from the domain graph schema 300, for example, to be used as is, and/or modified. The user may design an application visually on an output screen (e.g., the output device 142) in real-time.

In an embodiment, the user may create a profiled application. The user may utter a natural language command to add an element present in the domain schema graph 300. For example, the user may utter, "add item field." The client computing device 102 may transmit the user's utterance as audio data (e.g., as a waveform) via the network 106. A module of the server computing device 104 (e.g., the analyzer module 166) may analyze the audio data. In some embodiments, the analyzer module 166 may forward the audio data to an external web service (e.g., a third party NLP processing service) for analysis. The analyzer module 166 may identify a command and/or one or more entities within the user's utterance, and may map the one or more utterances to one or more entity nodes within the domain schema graph 300. Continuing the example above, when the user utters, "add a cart," the analyzer module 166 may determine that the utterance corresponds to an add element command, and includes a reference to a cart entity. The analyzer module 166 may modify the profiled application 330 to include a cart entity corresponding to the cart entity node 302-A of FIG. 3A, for example. The analyzer module 166 may further apply styles in the user interface graph schema 310 to the added cart entity.

FIG. 3C depicts an exemplary profiled application 360. The profiled application 360 may begin as an empty application, in some embodiments (i.e., as an application template or shell). The user may utter, "add credentials field" to cause a credentials field set 362 to be added to the application 360 using the NLP-based techniques discussed above. The user may utter styling utterances to cause the field set 362 to be styled within the application 360. For example, the user may utter, "move to center." The analyzer module 166 may determine that the user's command includes a move command. The analyzer module 166 may infer that when a command lacks an explicit graphical user interface element, the user intends to manipulate the most recently modified/added element.

The user may utter commands to modify the functional aspects of added elements. For example, the user may utter, "link go button to new screen." The analyzer module may identify entities, including a linking action, a button entity and a new screen entity. The analyzer module may perform actions in response to identifying the entities, based on a set of predetermined instructions. For example, the link entity may be associated with instructions for adding a hyperlink to a form element (e.g., the button entity). The new screen entity may be associated with instructions for causing a new blank application template to be generated.

The user may issue natural language commands for adding predetermined types of information. For example, the user may utter, "add part information" to cause a part information table 360 to be added to the application 360. The user may utter "add graph of products by month" to cause a graph 362 to be added to the application 360. The prototype module 168 may store additional commands allowing the user to add other information types.

Exemplary Computer-Implemented Methods

Figure 4A:
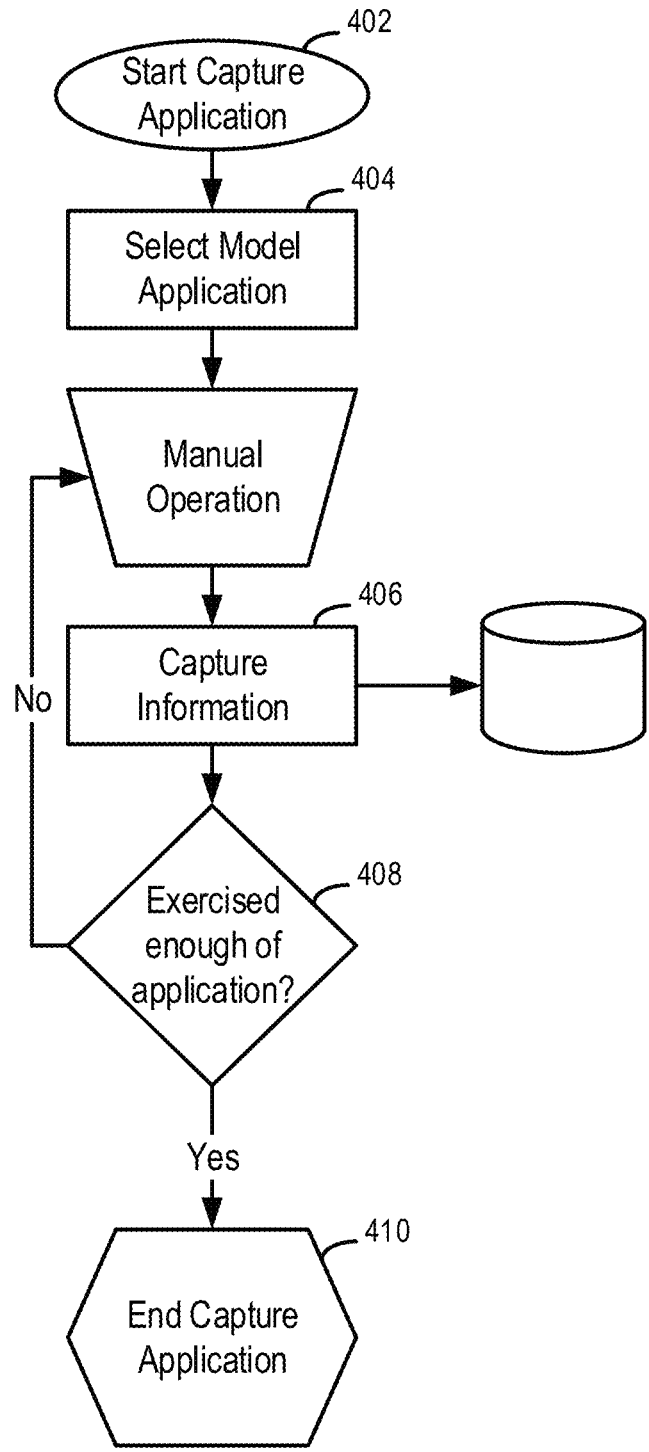
FIG. 4A depicts an exemplary flow diagram of an exemplary computer-implemented method for capturing information from an existing application, according to one embodiment.

In operation, the user may analyze an existing application (e.g., the profiled application 330) using the present techniques to generate domain, user interface, and/or dynamic graphs (e.g., the domain graph schema 300 and the user interface graph schema 310), which may be stored as a joined and/or separate knowledge graph (e.g., in the intermediate representation discussed above). The user may then modify the intermediate representation, and generate a modified profiled application (i.e., a prototype application). Specific use cases are discussed below Exemplary Computer-Implemented Method for Information Capture FIG. 4A depicts an exemplary flow diagram of an exemplary computer-implemented method 400 for capturing information from an existing application (e.g., the profiled application). The method 400 may include starting a capture application (block 402). For example, the capture application may correspond to a mobile application (e.g., a mobile application made available for download from an app store, such as the Google Play store, the iTunes Store, etc.). The user may download the mobile application to a memory of a device (e.g., the memory 114 of the client computing device 102 of FIG. 1). The capture application may include any suitable mechanism for allowing the user to start the capture application and to cause the capture application to begin capturing data.

As discussed above, the captured data may include any information directly and/or indirectly relating to the user's use of the profiled application, such as time spent per page, page URLs, application data sources accessed, keyboard inputs, mouse clicks, cursor movement, heatmaps, etc.

The method 400 may further include processing a user selection of a target model application (i.e., the profiled application) (block 404). The target application may be installed locally or remotely. For example, the method 400 may include displaying a user interface that prompts the user to type a URL of a web site application to profile. For example, the web site application may be located in the memory 154 of the server computing device 104. In some embodiments, the method 400 may prompt the user to select a path corresponding to an application installed locally on the user's device (e.g., another application installed in the memory 114). The means of selecting the local application may depend on the specific embodiment of the client computing device 102, when the method 400 is implemented in the client computing device 102. For example, the user may initiate the capture application at block 402 using a different mechanism on a desktop PC, as opposed to a mobile computing device.

Once the user has started the capture and selected the profiled application, the method 400 may include capturing information in response to the user's manual operation of the application (block 406). The method 400 may capture the information in a database (e.g., the database 108 of FIG. 1).

The method 400 may include determining when the user has exercised the profiled application sufficiently (block 408). The determining may be based upon one or more predetermined criteria, including without limitation the number of page impressions caused by the user, the amount of wall clock time the user spends using the profiled application, the amount of CPU cycles expended to service the user's usage of the profiled application, the number of screenshots captured during the user's usage, the amount of bandwidth consumed by the user's activity, etc. Once the user's usage has met the predetermined criteria, the method 400 may include ceasing capture.

It should be appreciated that the "user" may be an automated user (e.g., a script, such as a web crawler) in some embodiments. It should also be appreciated that the method 400 may include displaying a conspicuous notification/confirmation, prior to capturing usage-related information, to assure the user's privacy while using the system.

It should further be understood that implementing the method 400 may be implemented in any suitable device, including the server computing device. In other words, in some embodiments, the method 400 may be operated by a user of the server 104, to profile a mobile computing device executing in the memory 114 of the client computing device 102, for example.

Exemplary Computer-Implemented Method for Generating Linked Knowledge Graph

Figure 4B:
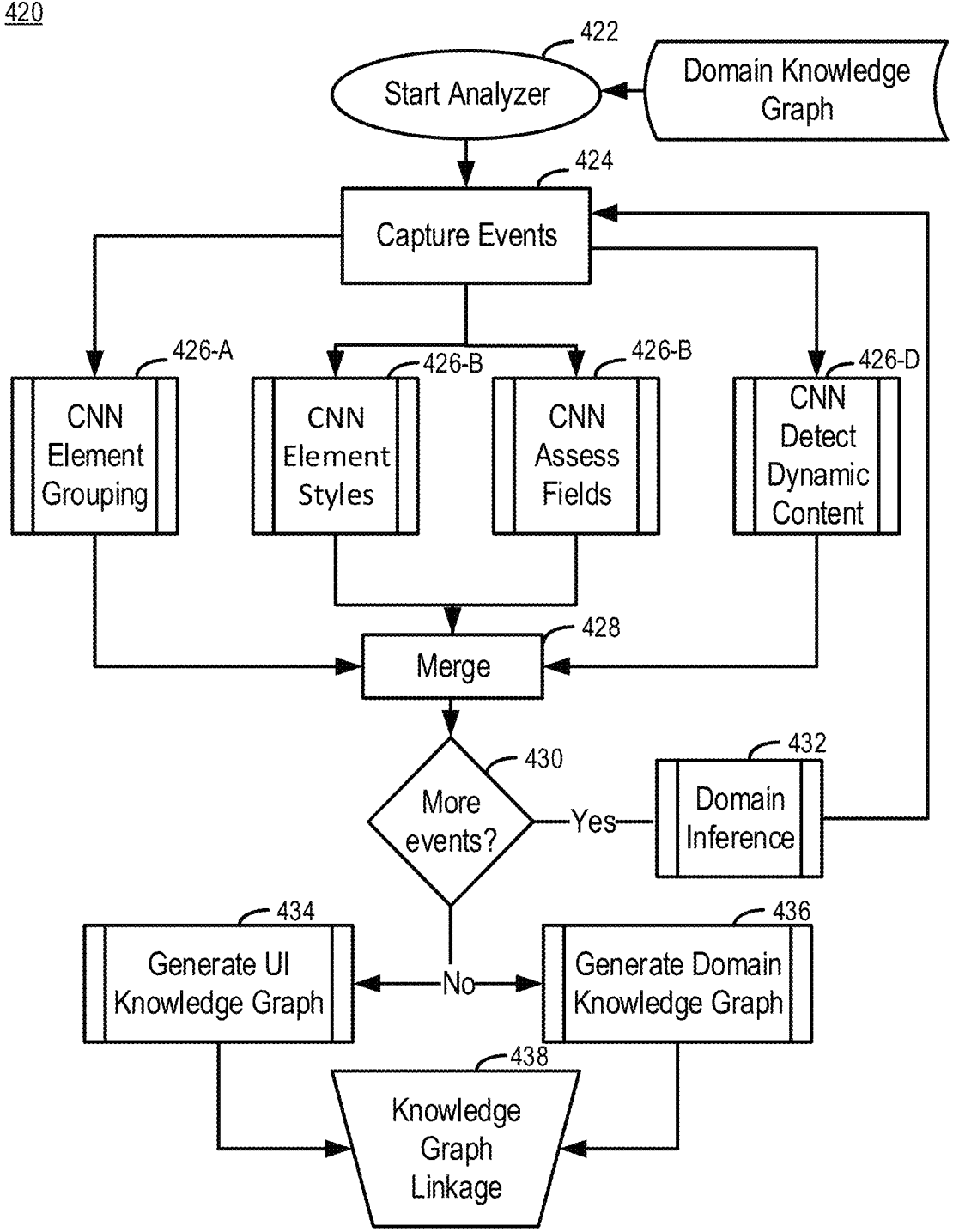
FIG. 4B depicts an exemplary flow diagram of an exemplary computer-implemented method for generating a linked knowledge graph corresponding to a profiled application, according to one embodiment.

FIG. 4B depicts an exemplary flow diagram of an exemplary computer-implemented method 420 for generating a linked knowledge graph corresponding to a profiled application. The method 420 may include receiving a domain knowledge graph (block 422). For example, the domain knowledge graph may correspond to the domain graph schema 300 of FIG. 3A. The method 420 may include capturing one or more events, wherein the events are identified by accessing elements of the domain knowledge graph (block 424).

The method 420 may include analyzing the events using one or more of convolutional neural networks (CNNs) (blocks 426-A through 426-D). In some embodiments, the CNNs may analyze the captured events in parallel, e.g., when the processor 150 of the server computing device 104 is implemented using a GPU. The method 420 may include merging the output of the one or more CNNs (block 428). The method 420 may include determining whether all events in the domain knowledge graph have been analyzed (block 430).

When all of the events have not been analyzed, the method 420 may include performing further domain inference (block 432). When the further domain inference identifies further events, the method 420 may further include analyzing the further events by repeating blocks 424-428 with respect to the further events.

When all of the events have been analyzed, the method 420 may include one or both of (i) generating a user interface knowledge graph (block 434), and (ii) generating a domain knowledge graph (block 436). The user interface knowledge graph and/or the domain knowledge graph may correspond to the graph 200 of FIG. 2, for example.

The user interface knowledge graph may correspond to the user interface graph schema 310 of FIG. 3B, for example. The method 420 may include combining the domain knowledge graph and the user interface graph into a linked knowledge graph (i.e., the intermediate representation) (block 438). The present techniques may then allow the user to modify the linked knowledge graph to generate a modified profiled application (i.e., a prototype application), as discussed with respect to FIG. 4C. The method 420 may further include storing one or both of (i) the user interface knowledge graph, and (ii) the domain knowledge graph (e.g., in the database 180).

Exemplary Computer-Implemented Method for Application Prototyping

Figure 4C:
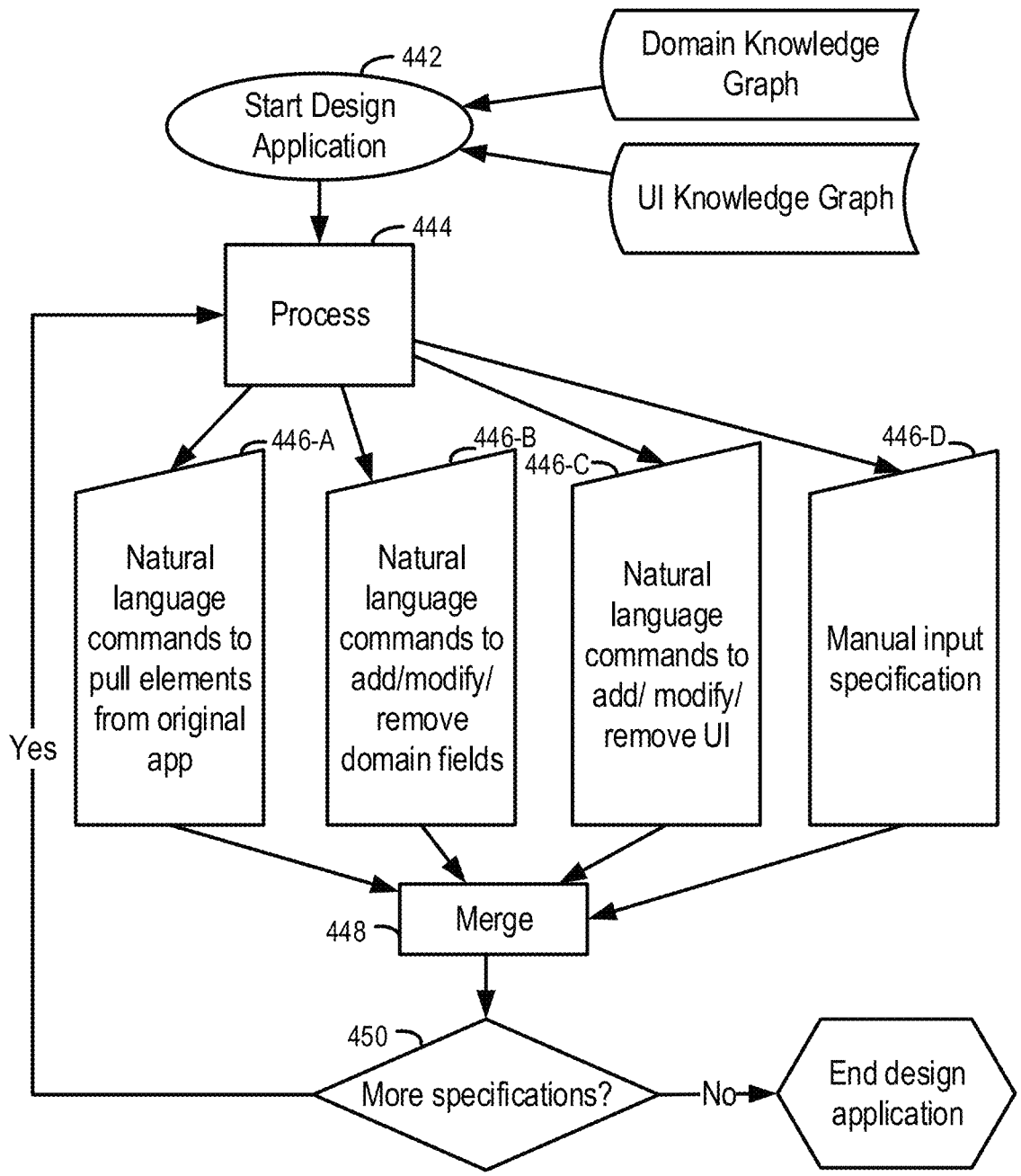
FIG. 4C depicts a flow diagram of an exemplary computer-implemented method for generating an application prototype based on the profiled application modified using one or more user-supplied specifications, according to one embodiment.

FIG. 4C depicts a flow diagram of an exemplary computer-implemented method 440 for generating an application prototype based on the profiled application modified using one or more user-supplied specifications.

The method 440 may analyze the domain knowledge graph and/or the user interface graph. The method 440 may include initializing a design application (block 442). As in the method 400, the user may start the design application. The method 440 may include the design application receiving/retrieving a domain knowledge graph and/or a user interface knowledge graph. For example, the method 440 may include querying a database (e.g., the database 180 of FIG. 1) and/or reading the graph information from the memory 114. In some embodiments, the method 440 may create a copy of the intermediate representation of the profiled application. The method 440 may include processing one or both of (i) the domain knowledge graph, and (ii) the user interface knowledge graph (block 444).

In an embodiment, the processing may include receiving and processing one or more natural language commands to pull one or more elements from the profiled application (block 446-A). In an embodiment, the processing may include processing one or more natural language commands (e.g., utterances) of the user to add, modify and/or remove one or more domain fields (block 446-B). For example, continuing the illustrative cart example, the user may utter, "add an item quantity."

As noted above, the natural language processing may include identifying one or more entities within the domain knowledge graph and/or the user interface knowledge graph. The natural language processing may include maintaining a reference to a last-edited element and inferring an element to which to apply user commands to.

In practice, the user may specify any domain information in the domain knowledge graph. In an embodiment, the processing may include receiving and processing one or more natural language commands to add, modify and/or remove one or more user interface elements (block 446-C). In an embodiment, the processing may include receiving and processing one or more manual input specifications (block 446-C). In some embodiments, the user may provide one or more specification requirements documents to the process 444. The method 440 may include merging such documents may with the style of the profiled application.

The method 440 may include merging the modifications outputting a merged application (block 448). The merged application may be a copy of the profiled application, including modifications caused by steps 446-A, 446-B, 446-C and/or 446-D. The method 440 may include determining whether any more specifications remain to be applied (block 450). The following figures depict examples of applying the method 440 to generate a prototype application wherein the user's modifications are merged into an existing application profile.

Exemplary Natural Language-Driven Prototyping Embodiment

Figure 4D:
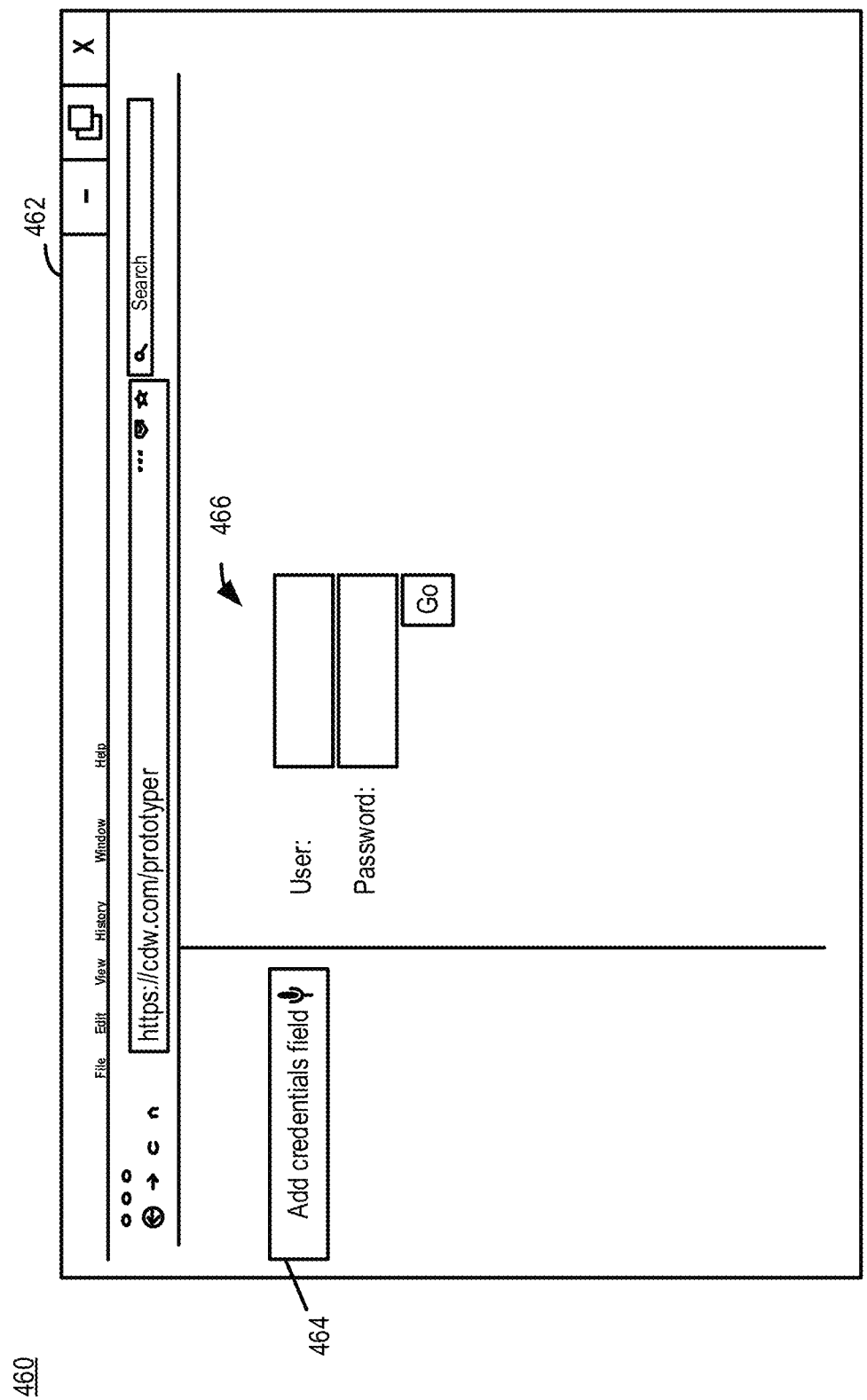
FIG. 4D depicts an exemplary computing environment including a graphical user interface for performing application prototyping, according to one embodiment.

FIG. 4D depicts an exemplary computing environment 460 including a graphical user interface (GUI) 462 for performing application prototyping. The GUI module 122 of FIG. 1 may include instructions for displaying the GUI 462 (e.g., in the output device 142 of FIG. 1).

The GUI 462 includes a voice input field 464 allowing the user to input voice commands. For example, the user may select an indicator within the voice input field 464. In response to the selection, the GUI 462 may prompt the user to enter a voice command (e.g., via the input device 140 of FIG. 1).

The GUI module 122 may transmit the user's voice command as a waveform (e.g., a waveform audio file format) via the network 106 to the prototype module 168, for example. A sub-module of the modules 160 may analyze the user's command to identify one or more entities and/or one or more predefined commands, as discussed above.

For example, the user may utter "add credentials field" as depicted in FIG. 4D. In response to analyzing the user's utterance, the GUI 462 may add a credentials field 466. The credentials field may be an entity that includes the username field, password field and submit button. The credentials field may be an object stored in the database 180, for example. The prototype module 168 may include instructions for retrieving the credentials field object and for transmitting the credentials field to the GUI module 122. The GUI module 122 may include instructions for updating the GUI 462 to include the credentials field 466.

In some embodiments, the prototype module 168 may add the credentials field object to an existing knowledge graph (e.g., the knowledge graph 200). Then, the emitter module 170 may generate the entire GUI 462, including the credentials field, in response to the user's utterance. In this way, the form of the credentials field may be determined based on the target platform. For example, when the GUI 462 is a mobile application, the credentials field may be generated using a mobile software development kit (SDK) as opposed to HTML or another target display medium.

Figure 4E:
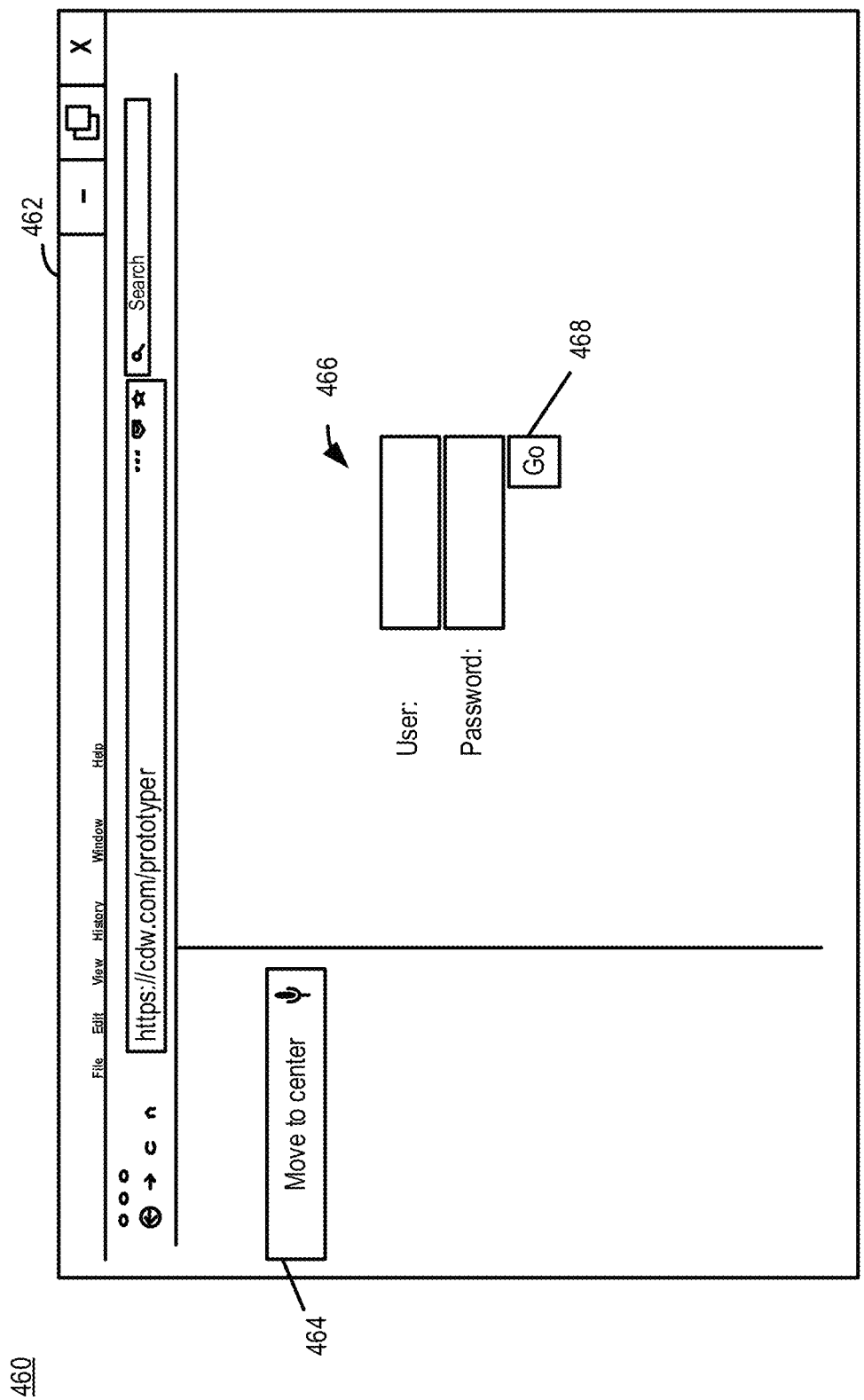
FIG. 4E depicts an exemplary computing environment including a graphical user interface for performing application prototyping that may correspond to the graphical user interface of FIG. 4D, according to one embodiment.

The user may modify existing elements within the GUI 462. FIG. 4E depicts an exemplary computing environment 460 including a GUI 462 for performing application prototyping that may correspond to the GUI 462 of FIG. 4D. The user may utter a command via the voice input field 464. For example, the user may utter "move to center." The GUI module 122 may include instructions for maintaining a reference to the most recently edited node or nodes within the knowledge graph corresponding to the GUI 462. For example, the GUI 122 may maintain the reference to the credentials field 466. When the user utters an utterance without a subject, such as "move to center," the GUI 122 may infer that the user is referring to the credentials field 466. Similarly, the user may utter, "link the Go button to a new page." The GUI 122 may infer that the user is referring to a button 468. The position of the credentials field 466 may be represented in the user interface knowledge graph corresponding to the GUI 462, in some embodiments.

Figure 4F:
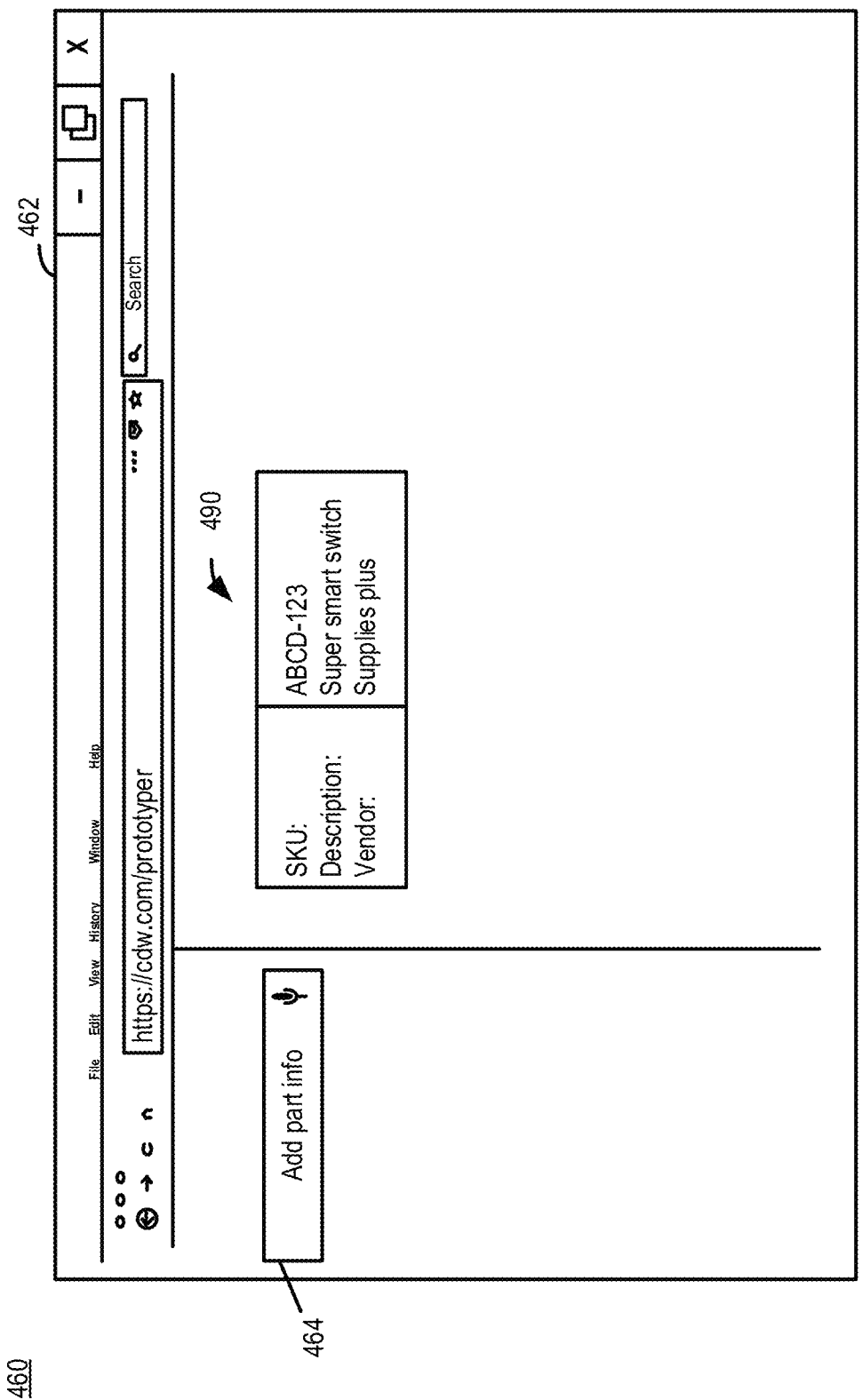
FIG. 4F depicts an exemplary computing environment including a graphical user interface for performing application prototyping that may correspond to the graphical user interface of FIG. 4E, according to one embodiment.

FIG. 4F depicts an exemplary computing environment 460 including a GUI 462 for performing application prototyping that may correspond to the GUI 462 of FIG. 4E. FIG. 4F depicts an example of a user adding tabular information. Specifically, the user may utter "Add part info" via the voice input 464. In response to the utterance, the prototype module may add a table information element 490 to the knowledge graph. The emitter module 170 may generate the GUI 462 for display by the module 122 of FIG. 1, for example. The entity part info may be defined in the domain knowledge graph, as discussed above.

Figure 4G:
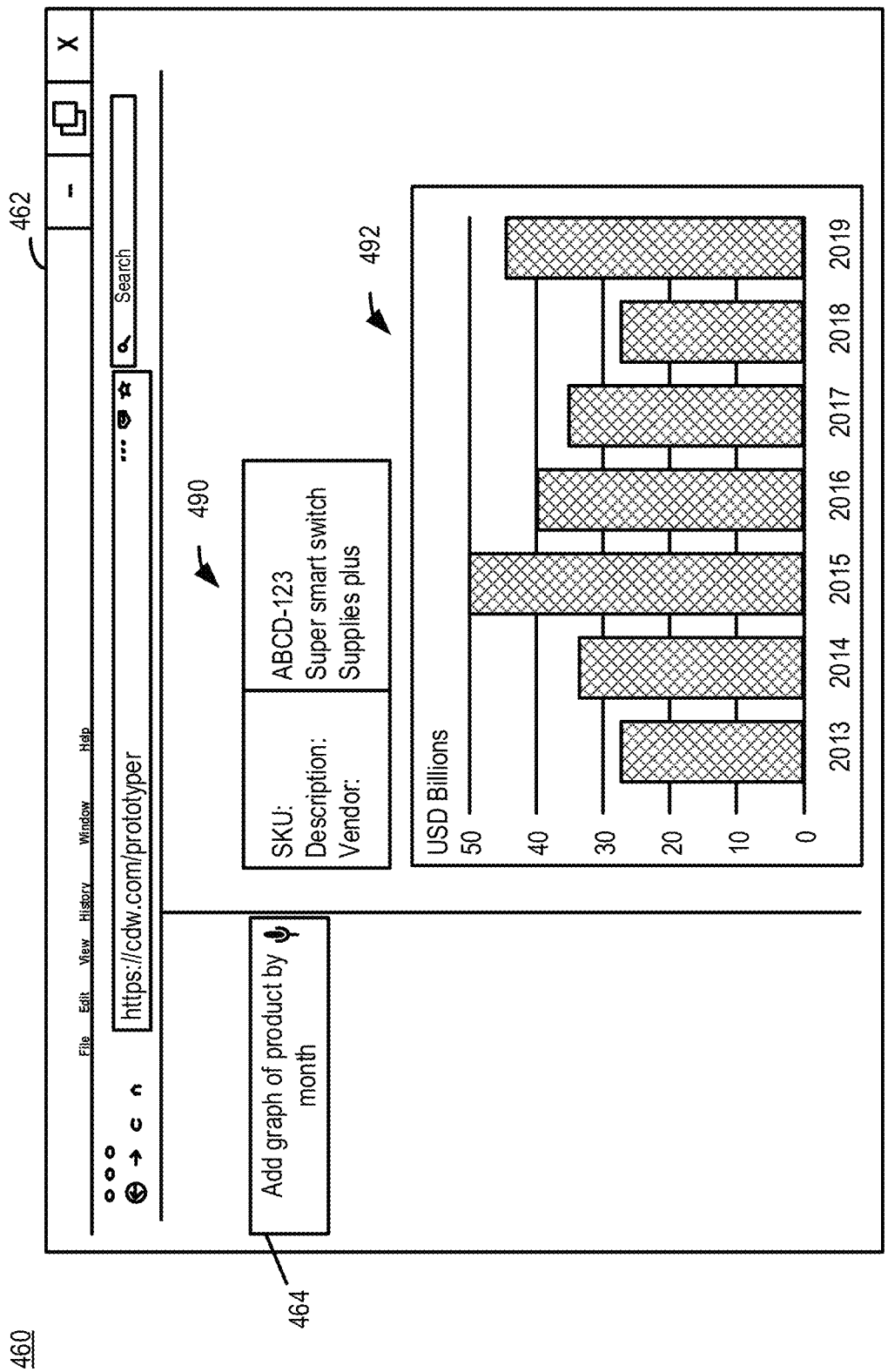
FIG. 4G depicts an exemplary computing environment including a graphical user interface for performing application prototyping that may correspond to the graphical user interface of FIG. 4F, according to one embodiment.

FIG. 4G depicts an exemplary computing environment 460 including a GUI 462 for performing application prototyping that may correspond to the GUI 462 of FIG. 4F. FIG. 4G depicts an example of a user adding graphical elements. Specifically, the user may utter "add graph of product by month." A product graph may be an entity of the domain knowledge graph, as discussed above. The entity "by month" may correspond to a parameter provided to the product graph allowing the user to specify information displayed in one axis of a graph 492. The prototype module 168 may add the entity and the parameter to the knowledge graph corresponding to the GUI 462. The emitter module 170 may generate the graph 492 by applying the parameter to the graph entity element.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A computer-implemented method for improving automated generation of an application prototype based on a profiled application, the method comprising:
   capturing one or more input events corresponding to the profiled application, the input events generated by a computer peripheral device in response to a user using the profiled application;
   analyzing the captured input events to generate a domain knowledge graph and a user interface knowledge graph, wherein analyzing the captured events to generate the domain knowledge graph and the user interface knowledge graph includes analyzing the events using a machine learning model trained to identify one or more features corresponding to the profiled application;
   receiving a natural language utterance from a user;
   identifying at least one entity and at least one command in the natural language utterance;
   modifying the domain knowledge graph and the user interface knowledge graph by analyzing the at least one entity and the at least one command; and
   emitting the application prototype by analyzing the modified domain knowledge graph and modified user interface knowledge graph.

2. The computer-implemented method of claim 1, wherein capturing the one or more events corresponding to the profiled application includes analyzing one or both of (i) source code of the profiled application, and (ii) a database schema of the profiled application.

3. The computer-implemented method of claim 1, wherein modifying the domain knowledge graph and the user interface knowledge graph by analyzing the at least one entity and the at least one command includes adding at least one user interface element.

4. The computer-implemented method of claim 1, wherein modifying the domain knowledge graph and the user interface knowledge graph by analyzing the at least one entity and the at least one command includes repositioning at least one user interface element.

5. The computer-implemented method of claim 1, wherein modifying the domain knowledge graph and the user interface knowledge graph by analyzing the at least one entity and the at least one command includes copying an element from the profiled application into the profiled application.

6. The computer-implemented method of claim 1, further comprising:
   displaying the application prototype in an output device of the user.

7. A server for improving automated application prototype generation comprising:
   one or more processors; and
   a memory storing instructions that, when executed by the one or more processors, cause the server to:
   capture one or more input events corresponding to a profiled application, the input events generated by a computer peripheral device in response to a user using the profiled application;
   analyze, by using a machine learning model trained to identify one or more features corresponding to the profiled application, the captured input events to generate a domain knowledge graph and a user interface knowledge graph;

receive a natural language utterance from a user;

identify at least one entity and at least one command in the natural language utterance, modify the domain knowledge graph and the user interface knowledge graph by analyzing the at least one entity and the at least one command; and emit the application prototype by analyzing the modified domain knowledge graph and modified user interface knowledge graph.

8. The server of claim 7, wherein the instructions further cause the server to:

analyze one or both of (i) source code of the profiled application, and (ii) a database schema of the profiled application.

9. The server of claim 7, wherein the instructions further cause the server to:

analyze the at least one entity and the at least one command includes adding at least one user interface element.

10. The server of claim 7, wherein the instructions further cause the server to:

analyze the at least one entity and the at least one command includes repositioning at least one user interface element.

11. The server of claim 7, wherein the instructions further cause the server to:

analyze the at least one entity and the at least one command includes copying an element from the profiled application into the profiled application.

12. The server of claim 7, wherein the instructions further cause the server to:

display the application prototype in an output device of the user.

13. A non-transitory computer readable medium containing program instructions that when executed, cause a computer to:

capture one or more input events corresponding to a profiled application, the input events generated by a computer peripheral device in response to a user using the profiled application;

analyze, by using a machine learning model trained to identify one or more features corresponding to the profiled application, the captured input events to generate a domain knowledge graph and a user interface knowledge graph;

receive a natural language utterance from a user;

identify at least one entity and at least one command in the natural language utterance;

modify the domain knowledge graph and the user interface knowledge graph by analyzing the at least one entity and the at least one command; and emit an application prototype by analyzing the modified domain knowledge graph and modified user interface knowledge graph.

14. The non-transitory computer readable medium of claim 13 containing further program instructions that when executed, cause a computer to:

analyze one or both of (i) source code of the profiled application, and (ii) a database schema of the profiled application.

15. The non-transitory computer readable medium of claim 13 containing further program instructions that when executed, cause a computer to:

analyze the at least one entity and the at least one command includes adding at least one user interface element.

16. The non-transitory computer readable medium of claim 13 containing further program instructions that when executed, cause a computer to:

analyze the at least one entity and the at least one command includes repositioning at least one user interface element.

17. The non-transitory computer readable medium of claim 13 containing further program instructions that when executed, cause a computer to:

display the application prototype in an output device of the user.

* * * * *

UNITED STATES PATENT AND TRADEMARK OFFICE
CERTIFICATE OF CORRECTION

PATENT NO. : 11,790,892 B1
APPLICATION NO. : 16/885183
DATED : October 17, 2023
INVENTOR(S) : Joseph Kessler Page 1 of 1

It is certified that error appears in the above-identified patent and that said Letters Patent is hereby corrected as shown below:

In the Claims

At Column 21, Line 6, "utterance," should be -- utterance; --.

Signed and Sealed this
Twenty-first Day of October, 2025

John A. Squires
*Director of the United States Patent and Trademark Office*